(No Model.)

3 Sheets—Sheet 1.

T. ADAMS.
CORD COVERING MACHINE.

No. 492,618. Patented Feb. 28, 1893.

Witnesses:
Hamilton D. Turner
Fred D. Goodwin

Inventor:
Thomas Adams
by his Attorneys
Hosey & Howson

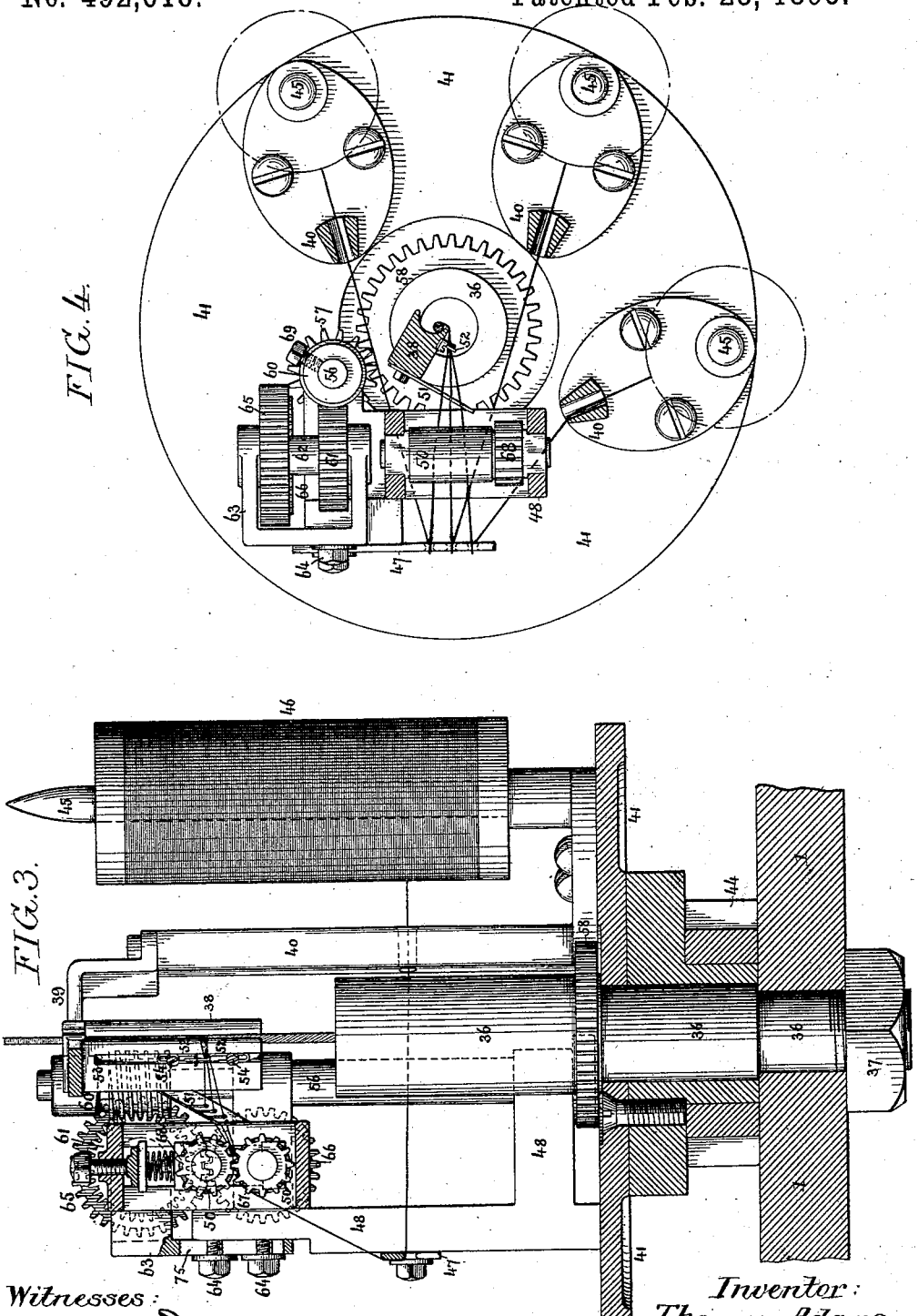

UNITED STATES PATENT OFFICE.

THOMAS ADAMS, OF PHILADELPHIA, PENNSYLVANIA, ASSIGNOR TO THE HENSEL-COLLADAY COMPANY, OF SAME PLACE.

CORD-COVERING MACHINE.

SPECIFICATION forming part of Letters Patent No. 492,618, dated February 28, 1893.

Application filed July 6, 1891. Serial No. 398,535. (No model.)

*To all whom it may concern:*

Be it known that I, THOMAS ADAMS, a citizen of the United States, and a resident of Philadelphia, Pennsylvania, have invented certain Improvements in Cord-Covering Machines, of which the following is a specification.

The object of my invention is to provide a machine for covering with strands of silk, or other expensive material a strand or core of cotton, jute, or other inexpensive material, the special features of the invention being fully set forth and specifically claimed hereinafter.

Figure 1:
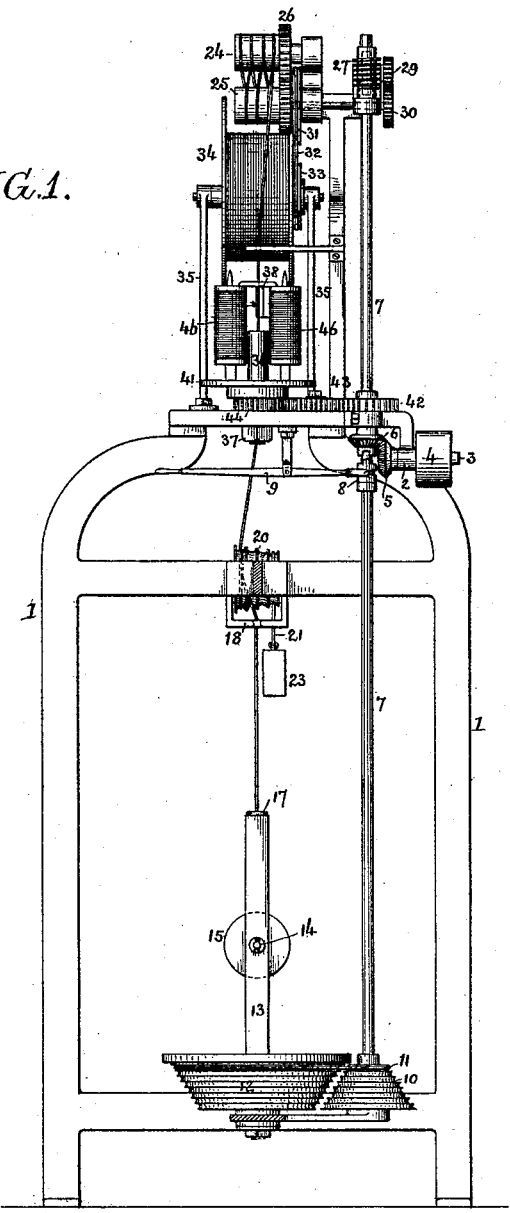
Figure 5:
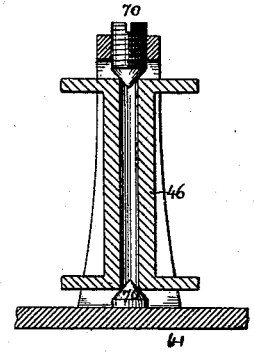
Figure 2:
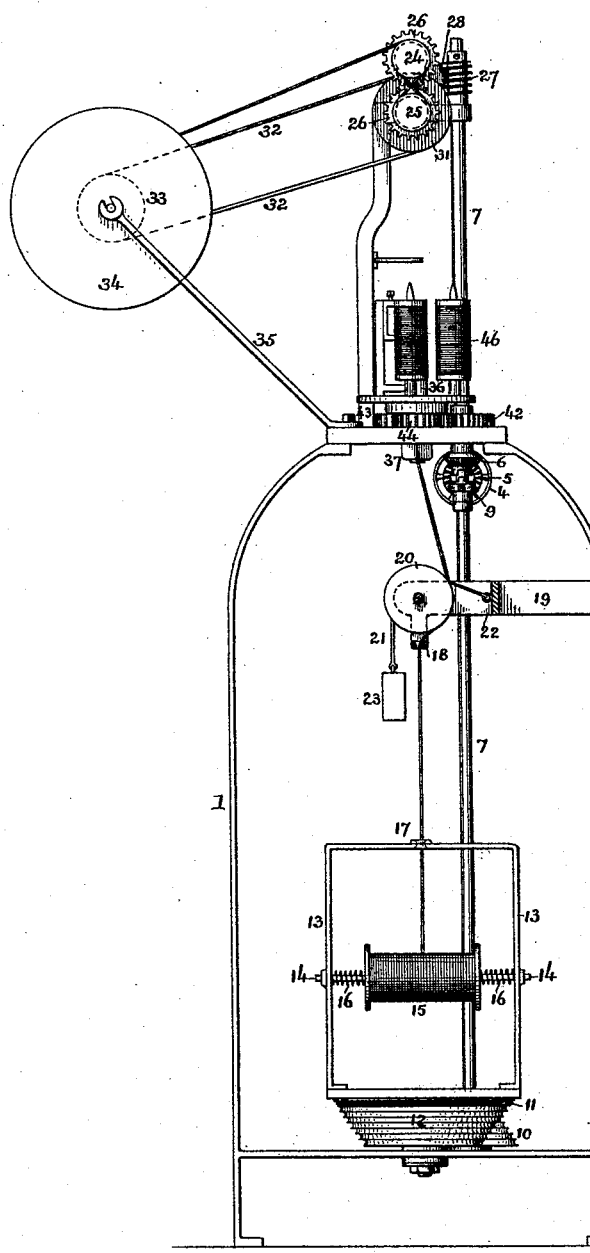

In the accompanying drawings:—Figure 1, is a front view, partly in section, of a cord covering machine constructed in accordance with my invention. Fig. 2, is a side view of said machine. Figs. 3 and 4, are respectively a vertical section and a plan view, partly in section, of the mechanism for effecting the feeding and spreading of the covering strands and the laying of the same upon the central strand or core; and Fig. 5, is a sectional view illustrating a modification of part of the machine.

In Figs. 1 and 2 the main frame of the machine is represented at 1, and to a suitable bearing 2 on this frame is adapted a shaft 3 having a pulley 4 for receiving a suitable driving belt and also having a bevel wheel 5 which meshes with a bevel wheel 6 on a vertical shaft 7 likewise adapted to suitable bearings on the main frame 1, of the machine; this bevel wheel 6 being loose on the shaft 7 but having a clutch face for engagement with a clutch sleeve 8 controlled by an operating lever 9 and splined upon the shaft 7 so that when the clutch faces are in engagement the bevel wheel 6 will be caused to rotate said shaft 7.

The shaft 7 has at the lower end a cone pulley 10 which, by means of a belt 11, drives a cone pulley 12 on which is mounted a frame 13 carrying a shaft 14 for a spool 15, from which is drawn the strand or strands to form the core of the finished cord, this spool being confined between opposite springs 16, each interposed between a head of the spool and the adjacent leg of the frame 13 so that the spool can move laterally on the shaft 14 if the line of draft requires such movement. The core strand passes from the spool 15 up through a central eye 17 at the top of frame 13 so that said strand is twisted in its delivery from the spool 15, the degree of twist being dependent upon the speed of rotation of the frame 13, and this speed being governed by the adjustment of the belt 11 upon the cone pulleys 10 and 12 so that any desired degree of twist can be imparted to the core strand. The strand passes from the eye 17 to and through an eye 18 on a frame 19 and thence one or more times around a grooved drum or capstan 20 mounted in bearings on said frame and subjected to the braking influence of a cord 21 which is connected at one end to an eye 22 on the frame 19 and passes partway around one of the grooved faces of the drum 20 and is provided at its pendent end with a weight 23.

The core strand passes from the tension drum 20 up to and through the covering mechanism to be hereinafter described and thence to and around a pair of drawing drums or capstans 24 and 25 which are geared together by spur wheels 26, the lower drum being driven from the shaft 7 through the medium of a worm 27, worm wheel 28 and spur gears 29 and 30 (see Fig. 1). On the shaft of the lower drum 25 is a pulley 31 which receives a belt 32 adapted to a pulley 33 on a receiving drum or spool 34 mounted in bearings on arms 35, the covered cord passing from the drawing drums to said spool, and being wound thereon as fast as it is delivered by the drums, the belt 32 and pulleys 31 and 33 providing a frictional driving device for said receiving spool.

The mechanism for applying the covering strands to the core strand is shown on an enlarged scale in Figs. 3 and 4 on reference to which it will be observed that the strand, on leaving the tension drum 20, passes up through a hollow spindle 36 secured to the fixed frame 1 by means of a nut 37, and on leaving said hollow spindle, passes upward through a groove in the face of a bar 38 depending from a cross bar 39 which connects the upper ends of two of the standards 40 forming part of the device, these standards being mounted upon a disk 41, which is free to turn around the spindle 36 and receives a rotating motion from the shaft 7 through the medium of spur wheels 42, 43 and 44, as shown in Fig. 1.

The rotating disk 41 has a series of spindles 45 carrying the spools 46 from which the covering strands are drawn, there being in the present instance three of these spools, although more or less than this number can be used, if desired.

The strand from each spool passes first through a guide eye in the standard 40, thence through a guide eye in a bar 47 mounted on an upright frame 48, thence between a pair of feed rolls 50 covered with rubber or other elastic or semi-elastic material, and thence through a guide eye in a bar 51 projecting from the grooved bar 38 all of the strands being then collected so as to pass through a guide eye formed by upper and lower wires 52 guided in a groove 53 in the face of the bar 38 and secured in position after adjustment by set screws 54 so that the size of the guide eye for the bunched threads may be readily varied to accord with the size and number of such threads. From this last guide eye the covering threads or strands pass over one of the edges of the bar 38 and thence onto the strand or strands constituting the core of the cord.

As the core is constantly ascending while the covering strands are being lapped around the same, it follows that the character of the covering will be dependent upon the relative rate of travel of the core and the speed of rotation of the feed rolls 50 and bar 38, so that, by properly regulating these speeds, the covering strands may be laid either closely together or may be scattered to any desired extent, depending upon the character of the work to be produced, the fact that the covering strands are caused to pass over the edge of the bar 38 before reaching the core, however, effectually preventing the riding of one strand over the other and thus preventing crowding or irregularity in the disposal of the covering strands upon the core.

The rotation of the feed rolls 50 is effected in the following manner:—The frame 48 has bearings for an upright shaft 56 which has at the lower end a spur pinion 57 meshing with a fixed spur wheel 58 secured to the central hollow spindle 36, so that, as the disk 41 rotates, the pinion 57 will be carried around the spur wheel 58 and a rotating movement will thereby be imparted to the shaft 56. At the upper end of said shaft is a worm 60 which meshes with a worm wheel 61 on a short transverse shaft 62 which is adapted to bearings in a frame 63 adjustable vertically on the frame 48 and capable of being secured in position after adjustment by set screws 64 adapted to a vertical slot 75 in the frame 63, as shown in Fig. 3. The shaft 62 carries a spur wheel 65 which meshes with a spur wheel 66 on the shaft of the lower feed roll 50 and the latter shaft is geared to the shaft of the upper feed roll by means of spur pinions 67 and 68, as shown in Fig. 3.

Owing to the adjustability of the frame 63, spur wheels 65 of different sizes can be employed and the speed of rotation of the feed rolls 50 thereby readily regulated to accord with the character of the work to be performed, vertical adjustment of the worm 60 on the upright shaft 56 being possible in order to permit of the vertical adjustment of the frame 63, for instance, said worm wheel may be held in position on the shaft by means of a set screw 69, as shown in Fig. 4.

In high speed machines, where the centrifugal force is considerable, it is preferable to mount the spools 46, upon conical centers 70, as shown for instance in Fig. 5, so that the spools can be turned more easily in unwinding the strands therefrom, than when said spools are mounted upon spindles 45, as in Fig. 3.

Having thus described my invention, I claim and desire to secure by Letters Patent—

1. The combination in a cord covering machine, of draft mechanism for the core strand, a bar serving as a bearing for said strand and presenting an edge adjacent thereto, feed rolls for the covering strands so located in respect to said bar that the strands are caused to pass around the edge of the bar before reaching the core, and gearing whereby the draft mechanism, the bearing bar and feed rolls are rotated positively and in consonance with each other, substantially as specified.

2. The combination in a cord covering machine, of draft mechanism for the core strand, a bar serving as a bearing for said core strand and presenting an edge adjacent thereto, a series of independent guides one for each of the covering strands whereby said strands will be separated before passing over the edge of the bar in order to reach the core, and means for causing the bar to effect the wrapping of the covering strands around the core strand, substantially as specified.

3. The combination in a cord covering machine, of draft mechanism for the core strand, a bar serving as a bearing for said core strand and presenting an edge adjacent thereto, a series of independent guides one for each of the covering strands, a condenser guide for bringing said strands together before they pass over the edge of the bar in order to reach the core, and means for causing the bar to effect the wrapping of the covering strands around the core strand, substantially as specified.

4. The combination in a cord covering machine, of draft mechanism for the core strand, a bar serving as a bearing for said core strand and presenting an edge adjacent thereto, a series of guides for separating the covering strands, a condenser guide comprising parts adjustable from and toward each other, and serving to bring the covering strands together before they pass over the edge of the bar in order to reach the core, and means for causing the bar to effect the wrapping of the covering strands around the core strand, substantially as specified.

5. The combination in a cord covering machine, of draft mechanism for the core strand, a bar serving as a bearing for said core strand and presenting an edge adjacent thereto, rotating mechanism for the bar, feed rolls for the covering strands so located in respect to said bar that the strands are caused to pass around the edge of the bar before reaching the core, combined spur and worm gearing for rotating said feed rolls, a frame carrying one of said spur wheels and the worm wheel, and means for adjusting said frame so that the spur wheel may be of any desired diameter in order to vary the speed of the feed rolls, substantially as specified.

6. The combination in a cord covering machine, of draft mechanism for the core strand, a bar serving as a bearing for said core strand and presenting an edge adjacent thereto, feed rolls for the covering strands, a disk upon which said bar and feed rolls are mounted, rotating mechanism for said disk, and gearing for operating said rolls, said gearing comprising a vertical shaft mounted upon the disk and rotating both around its own axis and around the axis of the disk, a pinion on said shaft, a fixed central pinion meshing therewith, and gearing having as elements a worm and worm wheel through the medium of which the rotating movement of said shaft is transmitted to the feed rolls, substantially as specified.

7. The combination in a cord covering machine, of covering devices, draft mechanism for the core strand, a tension drum around which said strand is coiled before it reaches the covering devices, and a rotating flier carrying the spool from which the core strand is drawn, said parts being located as described, whereby the core strand is twisted between the flier and the tension drum but passes from the latter to the covering devices and draft mechanism without further twist, substantially as specified.

In testimony whereof I have signed my name to this specification in the presence of two subscribing witnesses.

THOMAS ADAMS.

Witnesses:
 EUGENE ELTERICH,
 HARRY SMITH.